United States Patent
Stephan et al.

(10) Patent No.: US 6,882,842 B2
(45) Date of Patent: Apr. 19, 2005

(54) CONTROL CHANNEL RESELECTION IN AN AUTONOMOUS MOBILE SYSTEM

(75) Inventors: Robert Stephan, Altamonte Springs, FL (US); Pramod S. Badjate, San Jose, CA (US)

(73) Assignee: Lucent Technologies Inc., Murray Hill, NJ (US)

( * ) Notice: Subject to any disclaimer, the term of this patent is extended or adjusted under 35 U.S.C. 154(b) by 608 days.

(21) Appl. No.: 09/844,690

(22) Filed: Apr. 27, 2001

(65) Prior Publication Data

US 2004/0180656 A1 Sep. 16, 2004

(51) Int. Cl.⁷ .................................................. H04Q 7/20
(52) U.S. Cl. ...................................... 455/434; 455/450
(58) Field of Search ................................ 455/450, 434, 455/422.1, 426.1, 426.2, 552.1, 451, 455, 464

(56) References Cited

U.S. PATENT DOCUMENTS

| | | | | |
|---|---|---|---|---|
| 5,903,839 A | * | 5/1999 | Mattila | 455/434 |
| 5,924,038 A | * | 7/1999 | Uistola | 455/450 |
| 5,940,760 A | * | 8/1999 | Uistola | 455/434 |
| 5,953,665 A | * | 9/1999 | Mattila | 455/434 |
| 6,263,211 B1 | * | 7/2001 | Brunner et al. | 455/464 |
| 6,421,328 B1 | * | 7/2002 | Larribeau et al. | 455/450 |
| 6,542,741 B1 | * | 4/2003 | Wallstedt et al. | 455/434 |

OTHER PUBLICATIONS

ANSI/TIA/EIA–136, "TDMA Cellular PCS," Rev. B, Mar. 1, 2000.

* cited by examiner

*Primary Examiner*—David Hudspeth
*Assistant Examiner*—Huy D Nguyen
(74) *Attorney, Agent, or Firm*—David A. Zwick; Steven R. Santema

(57) ABSTRACT

A method wherein an autonomous system that must move off of the current DCCH channel: determines a new DCCH channel; transmits on the current DCCH channel a new PSP/POF list in which the new DCCH replaces the current DCCH, transmitting the new PSP/POF list for a time sufficient for mobile stations camped on the current DCCH to update their PSP/POF lists; and begins broadcasting on the new DCCH channel. Whereby a MS camped on the current DCCH: receives the new PSP/POF list; updates its internal tables; loses communications on the current DCCH; performs the Control Channel Reselection procedure; finds the new DCCH channel; and camps on it.

24 Claims, 3 Drawing Sheets

CONTROL CHANNEL RESELECTION IN AN AUTONOMOUS MOBILE SYSTEM

FIELD OF THE INVENTION

The present invention relates to cellular telecommunication networks, and more particularly to a control channel reselection procedure for autonomous cellular systems that share radio spectrum with the public cellular system.

BACKGROUND OF THE INVENTION

In today's cellular systems, public cellular systems typically coexist with autonomous systems. An autonomous system is a private or residential cellular system that shares frequencies with the public cellular system. An autonomous system is typically located within a public cellular provider's radio coverage area, but has limited geographical reach, such as a building or campus. The autonomous system typically shares radio spectrum with the public cellular system so as to allow compatibility with existing mobile cellular telephones. However, the microsystem virtually always has the responsibility to avoid interference with the frequencies of the public cellular system.

One such cellular system is described in Telecommunications Industry Association/Electronic Industries Alliance (TIA/EIA) standards document ANSI/TIA/EIA-136, "TDMA Cellular PCS," Rev. B, Mar. 1, 2000, which is hereby incorporated by reference, which is a multi-part standard that defines the requirements for a PCS/cellular system using Time Division Multiple Access (TDMA) technology. This system uses Digital Control Channels (DCCHs) that communicate between the cellular network Base Station/Mobile Switching Center/Interworking functions (BMIs) and the mobile station (MS) of the cellular subscriber. Information exchanged on a DCCH enables the subscriber to gain access to the cellular system and, among other things, place and receive cellular calls. Once calls are established, voice and data traffic is carried on Digital Traffic Channels (DTCs).

The geographic service area covered by a public cellular provider's cellular system is divided into a number of generally contiguous cells, each cell having at least one DCCH and a number of DTC channels based on the desired traffic capacity for the cell. In an ANSI/TIA/EIA-136 compliant system, communications between the cell site base station and mobile stations in the base station coverage area take place over several defined broad frequency ranges. Each broad frequency range is divided into a set of defined frequencies, or physical channels. Each physical channel is divided into a plurality of TDMA time slots. Communications between the base station and the MS occurs as short digital bursts formatted to fit within a time slot, with each time slot tagged with identifier information. Messages exchanged between the base station and the MS typically span several contiguous time slots. There are two main types of communications between the base station and the MS: control information and digital traffic information. Message streams on a physical channel comprising messages associated with control functions are collectively referred to as the DCCH logical channel, and message streams comprising messages associated with digital traffic are collectively referred to as the Digital Traffic Channel (DTC) logical channel. Each main set of message types can be further divided into sets of message subtypes, with each message subtype set associated with a specific control or traffic function. Message streams comprising messages of one of the subtypes are referred to as logical subchannels, or simply channels, of the logical channels.

In the context of an autonomous system, the DCCH operating frequencies in use by the public cellular providers in the area of the autonomous system are referred to as Public Service Profiles (PSPs), and the DCCH operating frequencies in use by the autonomous systems are referred to as Private Operating Frequencies (POFs).

In a cellular system, a MS must always be monitoring, or "camped," on a DCCH in order to exchange the control information necessary to, among other things, place and receive phone calls. When a MS is powered on or otherwise initially appears in a cellular network, the MS must identify a suitable DCCH on which to camp. Section 3 of part 136-910 of ANSI/TIA/EIA-136 describes a reference model process that a MS may use to select a control channel. In this model, a MS first checks for service on the last used DCCH. If this DCCH is not found, the MS checks the POFs of autonomous systems (that the MS has stored in its memory) on which the MS has successfully registered in previous attempts. If a DCCH is not found, any methodology that a MS designer devises may be used to locate a DCCH before commencing a search for a DCCH by examining Analog Control Channels (ACCs) and DTCs for pointers to DCCHs, or by a frequency by frequency search of digital channels on the current band.

If a DCCH is found, it is examined for suitability from a signal strength perspective and from a service aspects perspective. If the DCCH fails the signal strength criteria or the service aspects criteria, the MS continues searching for a suitable DCCH. If the signal strength criteria and the service aspects criteria are met, the MS camps on this DCCH.

After the MS identifies and camps on a suitable DCCH, one of the first things it is required to do is make an initial reading of a full cycle of the Fast Broadcast Channel (F-BCCH) and the Extended Broadcast Channel (E-BCCH) subchannels of the DCCH and update any indicated parameters in the MS. The MS continuously monitors the F-BCCH and E-BCCH for updated data. The information broadcast on the F-BCCH and E-BCCH provides, among other things, a Neighbor List (NL) of nearby DCCH channels, including, in the case of an autonomous system, PSPs and POFs. After MS parameters have been updated with information from the F-BCCH and E-BCCH, the MS begins monitoring the signal strength and quality of the serving DCCH and of all DCCHs in the NL.

After a MS has camped on a DCCH, there are conditions that will trigger the MS to reselect a new DCCH on which to camp. These Reselection Trigger Conditions (RTC) are listed in Section 4.3.4.1 of part 123 of ANSI/TIA/EIA-136. The RTC are related to conditions such as poor signal strength or poor signal quality of the current DCCH, monitoring of signal strength and quality of the current DCCH and all DCCHs in the Neighbor List identifying a better DCCH than the current one, the current DCCH is barring the MS from camping, the MS receiving a message explicitly directing it to another DCCH, and the MS or MS user deciding to acquire service on a DCCH supporting a system of higher priority relative to the current DCCH, such as a private or residential system. In these conditions, the NL entries acquired on the current DCCH, POFs and/or a DCCH identified when an MS executes a band scan for DCCHs as a result of Non-Public Mode Search, serve as the candidate DCCHs for reselection.

The Control Channel Reselection procedure is described in Section 4.3 of part 123 of ANSI/TIA/EIA-136. This procedure comprises two sub-procedures. The Control Channel Locking procedure identifies suitable candidate DCCHs for reselection based on signal strength and quality. The Reselection Criteria procedure chooses a DCCH from the candidate DCCHs based on the RTC that caused the Control Channel Reselection procedure to be invoked.

In the context of a public cellular system, i.e., one in which there are no autonomous systems in the operating area of the MS, the Control Channel Reselection procedure is typically straight forward. The candidate DCCHs for reselection are the NL entries received by the MS in the initial reading of the E-BCCH after camping on the DCCH. These entries will generally be the DCCHs of the cells or sectors closest to the serving cell site. When the Control Channel Reselection procedure is invoked, the MS first checks for service on the last used DCCH, and then checks for service on the DCCHs of these closest cells or sectors. The MS quickly locates and camps on the last used DCCH if, for example, the MS temporarily lost signal, or on a DCCH geographically near to the last used one if, for example, the MS has moved to an area where the new DCCH signal is stronger than that of the last used DCCH.

When an MS is used in the context of an autonomous system, additional procedures are used in the Control Channel Reselection process. Because there may be a large number of autonomous systems in a public cellular service provider's area, and because the frequencies in use for each autonomous system are usually dynamic, the public provider does not include the DCCHs, or POFs, of the autonomous systems in the NL entries that are transmitted to the MS. Therefore, the normal automatic reselection procedures which are based solely on NL entries must be supplemented when a MS is searching for autonomous systems. When the channel reselection procedure is triggered on a MS camped on a public system DCCH, the MS must consider the POFs of the autonomous system as candidates for reselection.

Section 4.20 of part 123 of ANSI/TIA/EIA-136 describes the additional procedures that must be executed by a MS when control channel reselection procedures are triggered in an autonomous system. A mobile station will store two sets of frequencies for each autonomous system's Private System Identification (PSID) or Residential System Identification (RSID) that it retains in memory. The first set of frequencies correspond to DCCHs that have been assigned to the public cellular network BMIs in the general vicinity of the autonomous system. These frequencies, along with associated identification data, such as the public provider's System Identification (SID) and the channel's Digital Verification Color Code (DVCC), are referred to as the Public Service Profiles (PSPs) of the public system(s). The second set of frequencies represent candidate DCCH frequencies of the autonomous system, and are termed the Private Operating Frequencies (POFs). The standard calls for a mobile station to allow for the storage of a minimum of eight PSPs and eight POFs per autonomous system PSID or RSID.

Each time a mobile station camps on a DCCH, the frequency and DVCC of each stored DCCH PSP are compared to the frequency and DVCC of the current DCCH. If both the frequency and DVCC of any of the stored PSPs match the frequency and DVCC of its current DCCH, then a candidate autonomous system is considered as identified and the mobile station proceeds to examine the supplementary PSP information as follows.

If the SID associated with the PSP under consideration corresponds to the PSID/RSID of the candidate autonomous system, the mobile station declares a PSP match.

In other words, the MS has camped on a DCCH of the public system that is identified in the PSP/POF tables of the MS as being in the vicinity of a known DCCH of an autonomous system.

If the SID associated with the PSP under consideration does not corresponds to the PSID/RSID of the candidate autonomous system, the mobile station declares a PSP mismatch for the PSP under consideration Each time a mobile station tunes to the strongest or second strongest dedicated Analog Control Channel (ACC) while performing an Initialization task, the frequency, SID and Digital Color Code (DCC) of each stored ACC PSP are compared to the frequency, SID and DCC of this ACC. If the frequency, SID and DCC of any of the stored PSPs match with the frequency, SID and DCC of the strongest or second strongest dedicated ACC, the mobile station declares a PSP match. Otherwise, the mobile station declares a PSP mismatch for the PSP under consideration.

When a PSP match is declared while on a DCCH, the mobile station adds the POFs of the associated autonomous system to the list of channels identified as requiring signal strength measurements. The mobile station then, after an appropriate delay as required for channel measurement purposes, declares a Priority System Condition and uses the POFs as the list of reselection candidates. The mobile station also determines the MS-ACC-PWR, RSS-ACC-MIN, SS-SUFF and DELAY for the POFs prior to invoking or while executing the Control Channel Reselection procedure. When a PSP match is declared while on an ACC, the mobile station may determine that a DCCH is the preferred service provider, and enter the Control Channel Scanning and Locking State, using the associated POFs as candidates.

A mobile station will allow for manual initialization of PSPs and POFs, and will also allow for automatic initialization of PSPs and POFs upon initial selection of an autonomous system as follows:

Whenever a mobile station camps on a DCCH supporting a PSID or RSID that matches a PSID/RSID stored in its memory, and the Public bit of a Network Type indicator is set to zero, the mobile station updates the PSPs and POFs stored for the corresponding PSID/RSID;

To update the PSPs, the mobile station will store the first eight neighbor list entries received within a Neighbor Cell message or a Neighbor Cell (Multi Hyperband) message, that have a CELLTYPE of NON-PREFERRED. A CELLTYPE of NON-PREFERRED refers to a public provider's system. The mobile station first examines the Neighbor Cell List (TDMA) information element in an attempt to find eight neighbors having a CELLTYPE of NON-PREFERRED. If eight neighbors are not found in the Neighbor Cell List (TDMA) information element, the mobile station proceeds to examine the Neighbor Cell List (Other Hyperband) and then the Neighbor Cell List (Analog) information elements for additional neighbors;

To update the POFs, the mobile station stores the first eight neighbor list entries received within the Neighbor Cell message or the Neighbor Cell (Multi Hyperband) message, that have a CELLTYPE of PREFERRED or REGULAR. A CELLTYPE of PREFERRED or REGULAR refers to an autonomous system. The mobile station only examines the Neighbor Cell List (TDMA) information element in an attempt to find eight neighbors having a CELLTYPE of PREFERRED or REGULAR;

Whenever the mobile station stores a new set of PSPs or POFs for a given autonomous system PSID, it deletes the previous PSPs or POFs for that autonomous system PSID.

As mentioned above, an autonomous system base station shares frequencies with the cellular network of the public providers. The public system providers have mandated, in supplementary and proprietary specifications, that the private systems must react quickly to frequency changes in the public system to guarantee that the private systems are not transmitting on a frequency in use by that public system. This requires that the autonomous system constantly monitor the in-use frequencies of the public system, and then retune its own transceivers to channels that will not adversely affect RF performance in the public system. The autonomous system base station typically uses currently unused DTC channels of the public system for its own control and traffic channels. Since the demands of the public system are dynamic, the public system may at any time begin transmitting on a frequency that the autonomous system is using. When this occurs, the autonomous system must quickly abandon that frequency and move to a new frequency that is currently unused by the public system.

In an ANSI/TIA/EIA-136 compliant cellular network, a problem occurs in an autonomous system when a base station must move from a current DCCH to a new channel for use as a DCCH. The change in DCCH frequency forces all mobile stations that are camped on the current DCCH channel to execute a Control Channel Reselection procedure when radio communications to the autonomous system are lost on the current DCCH channel. As a result of the Control Channel Reselection procedure being executed, the MS will not automatically reacquire service (i.e., "camp") on the autonomous system after the DCCH change is complete, but will instead acquire service on a nearby public system, if possible.

From a public cellular provider perspective, DCCHs for a given cell change infrequently. Thus, the NL entries that are transmitted on the E-BCCH channel and downloaded by the MS reflect the current state of a very stable service-area-wide control channel topology. The control channel selection and reselection procedures are straight-forward for public systems, with the new control channel selection typically being a geographically contiguous neighboring public cell.

In a typical in-building autonomous system, coverage for the building is provided by one or more low power cells with each cell engineered to provide coverage to a specific zone of the building. The cell transmissions typically do not extend outside the shell of the building for any significant distance, although this depends on the materials of the building shell at any given point of the shell. Since the number of users of an autonomous system is comparatively low, an autonomous system cell typically transmits on a single DCCH. In a campus-wide autonomous system that may provide coverage to several buildings, open areas between buildings are typically outside the coverage area of the autonomous system so as to minimize interference with the public cellular systems in the area. The PSP/POF list transmitted by a cell of the autonomous system just described would typically include the DCCHs of all the nearby cells located in the building, plus the DCCHs of the cells that provide coverage of the entryways of other buildings of the campus-wide system. However, even though a campus-wide autonomous system may transmit on several cells, a MS is typically, at any given time, in the coverage area of a single DCCH.

When the autonomous system cell is forced to move from a current DCCH to a new DCCH frequency in order to avoid interference with a public system, DCCH transmissions on the current frequency abruptly end, and the mobile stations that are camped on the current DCCH must execute a Control Channel Reselection procedure. Since the POF entry in the NL referencing the current DCCH is no longer valid, and the MS is typically not in coverage areas of other cells of the autonomous system, the MS will locate and camp on a DCCH of one of the PSP entries of the public system in whose coverage area the desired autonomous system is located.

This reselection to a DCCH of the public system occurs automatically and unknown to the user of the autonomous system, with no urgent MS indication, such as an audible or vibratory alarm. This is very undesirable for the user. The user assumes the MS is registered with the desired autonomous system, and will begin to miss calls directed to it through the autonomous system.

Typically, the way a user becomes aware that the MS is no longer camped on the autonomous system is to notice that the system ID shown on the MS display screen is that of the public system and not that of the autonomous system. It may take some time before the user notices that a reselection to the public system has taken place.

One possible solution to this problem of automatic reselection to the public system without urgent notification is to constantly monitor the display screen of the MS. When there is indication that the MS has reselected to the public system, the user can invoke the New PSID/RSID Search procedure by navigating the user menus of the MS and selecting the proper option. This procedure, as described in Section 4.18.1. of part 123 of ANSI/TIA/EIA-136, essentially collects signal strength measurements on all frequencies of the current band and identifies the strongest 24 channels. Then, starting with the strongest signal first, the MS determines if the channel is a DCCH. If so, the MS reads the F-BCCH to determine if the system is an autonomous system that is enabled in the MS. If so, the MS attempts a test registration. If the test registration is accepted, the MS displays the alphanumeric name of the autonomous system to the user and allows the user to initiate service acquisition on the autonomous system.

A problem with this possible solution is that the user is required to constantly monitor the MS to see if a reselection to the public system has occurred. This can become disruptive and annoying to the user. The user must also manually invoke the New PSID/RSID Search procedure, then wait for the MS to display the accept/reject message. This can become time consuming and also annoying to the user. The user's annoyance is further compounded by the expectation that the MS will stay registered with the autonomous system while the MS is in the autonomous system's coverage area.

Another possible solution is for the autonomous system to choose DTC channels of the public system for use as DCCH channels of the autonomous system that have a lower probability of being in use. Although this possible solution may help to reduce occurrences of interference, there is no guarantee that a channel will not be used by the public system. In fact, in very high traffic areas, it is possible for all DTC channels of a public system to be in use, effectively shutting down the autonomous system.

OBJECTS OF THE INVENTION

Accordingly, it is an object of the present invention to provide a method and apparatus such that mobile stations camped on a current autonomous system DCCH will automatically reselect to the new DCCH when the autonomous system abandons transmissions on the current DCCH frequency and begins transmissions on the new DCCH frequency.

It is a further object of the present invention that the method and apparatus require no changes to the mobile stations.

SUMMARY OF THE INVENTION

The invention of Applicants is a method wherein an autonomous system that must move off of the current DCCH channel: determines a new DCCH channel; transmits on the current DCCH channel a new PSP/POF list in which the new DCCH entry replaces the current DCCH entry, transmitting the new PSP/POF list for a time sufficient for mobile stations camped on the current DCCH to update their internal PSP/POF lists; and begins broadcasting on the new DCCH channel. A MS camped on the current DCCH would receive the new PSP/POF list, update its internal tables, and then lose communications on the current DCCH. The MS would then perform the Control Channel Reselection procedure, find the new DCCH channel, and camp on it.

DESCRIPTION OF THE PREFERRED EMBODIMENT

Figure 1:
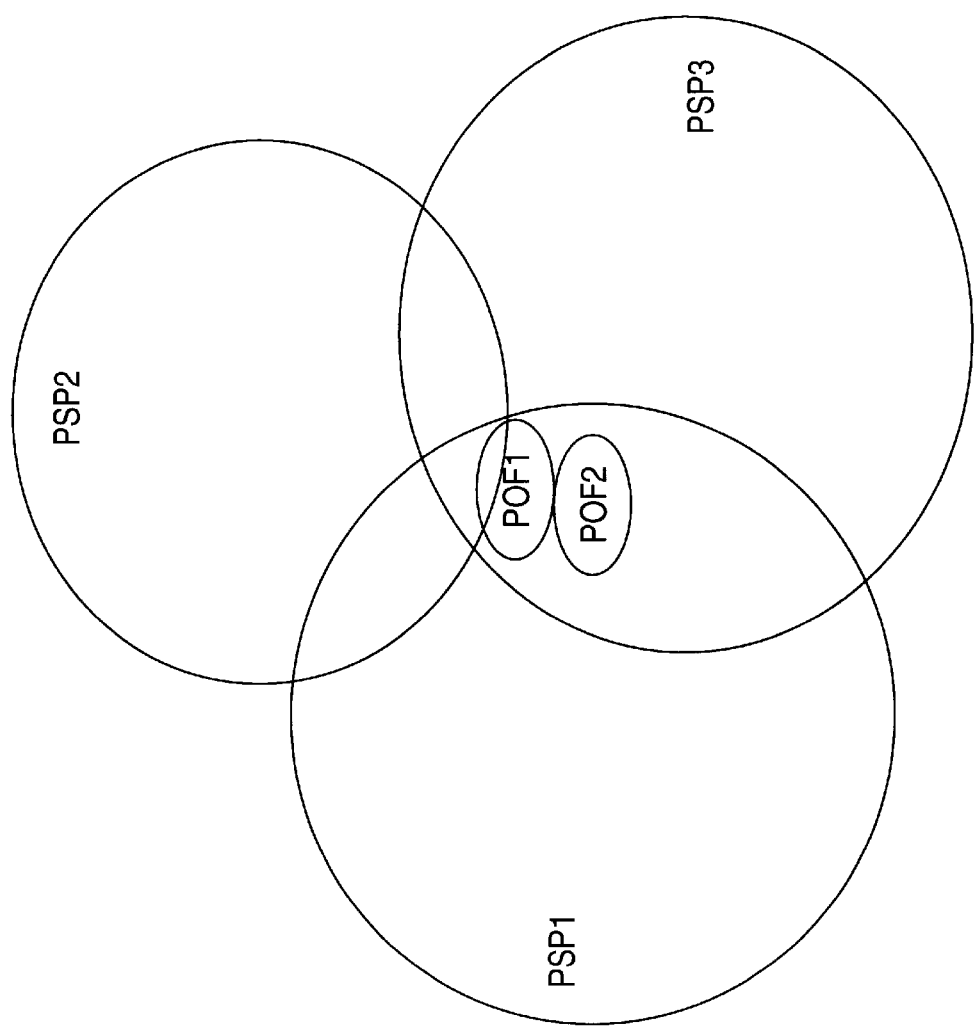
FIG. 1 illustrates an exemplary cell coverage scheme in which the present invention would operate.

FIG. 1 illustrates an exemplary cell coverage scheme in a ANSI/TIA/EIA-136 compliant cellular network in which Applicants' invention would operate. Shown are public system coverage areas labeled PSP1, PSP2 and PSP3, and autonomous system coverage areas labeled POF1 and POF2. Each coverage area has an associated base station, not shown, that operates on one or more control channels and one or more traffic channels. Each public system coverage area PSP1, PSP2 and PSP3 is associated with a System Identification (SID) of a public cellular provider network. Autonomous system coverage areas POF1 and POF2 are, in this example, part of the same autonomous cellular system, and are both associated with the Private System Identification (PSID) of the autonomous cellular network. The channels can be analog, i.e., Analog Control Channels (ACCs) and Analog Voice Channels (AVCs), or digital, i.e. Digital Control Channels (DCCHs) and Digital Traffic Channels (DTCs). Since the ANSI/TIA/EIA-136 standards covering the operations of analog systems and digital systems are very similar, and for ease of illustration, the preferred embodiments will be in the context of digital systems. However, Applicants' invention is not limited to digital systems, and those having skill in the art will readily be able to apply the invention as described to an analog system. As shown, public system coverage areas PSP1, PSP2 and PSP3 overlap some or all of autonomous system coverage areas POF1 and POF2.

Figure 2:
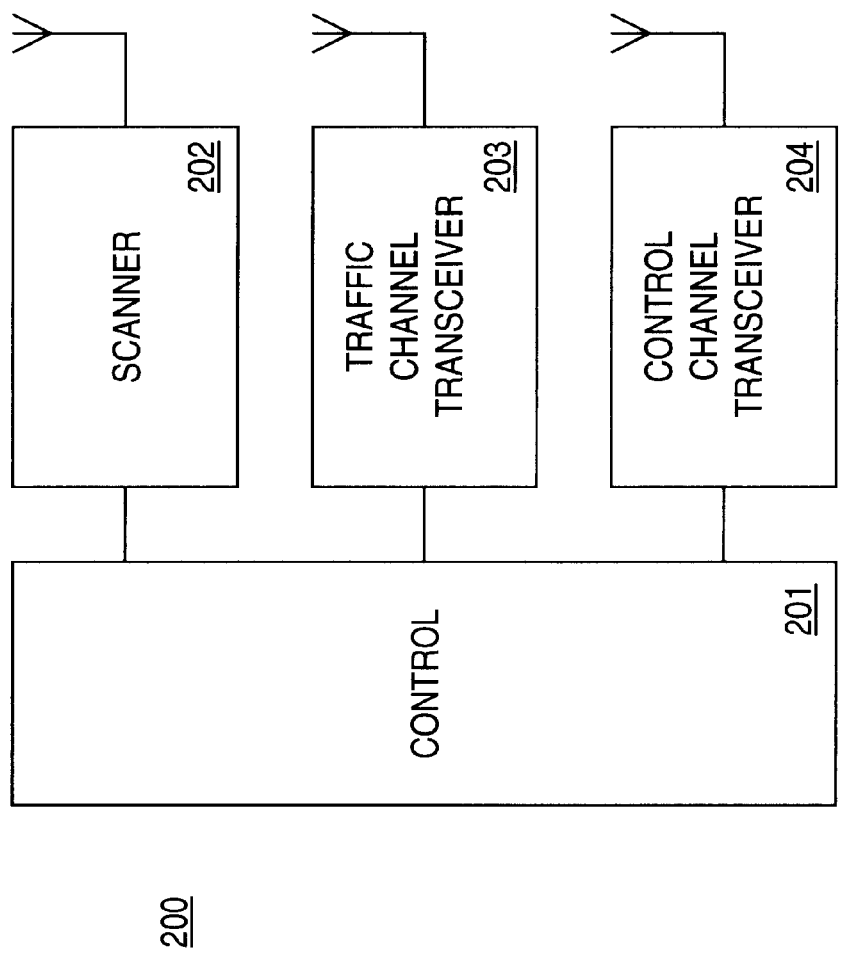
FIG. 2 shows a high-level functional block diagram of an autonomous system BMI of a preferred embodiment of the present invention.

FIG. 2 shows a high-level functional block diagram of an autonomous system 200 of a preferred embodiment of the present invention, such as would provide coverage for autonomous system coverage areas POF1 and POF2 of FIG. 1. Autonomous system 200 operates in compliance with ANSI/TIA/EIA-136. Traffic channel transceiver 203 handles a plurality of traffic channels with mobile stations engaged in phone calls. Control channel transceiver 204 transmits control information over one or more control channels to mobile stations locked to or camped on one of the control channels. Scanner 202 is used for detection and avoidance of interference with the public system. Traffic channel transceiver 203 and control channel transceiver 204, as a pair, typically comprise a base station of autonomous system 200, and there are typically a plurality of such base stations. There may be one or more of scanner 202 in an autonomous system 200. Scanner 202 scans for in-use frequencies of the public system base stations in the area, such as those providing coverage for public system coverage areas PSP1, PSP2 and PSP3 of FIG. 1. This information is used to generate PSP/POF lists, to indicate when interference from the public system has been detected on a channel of the autonomous system, and to provide information needed to choose new frequencies for the autonomous system that do not interfere with the public system. Scanner 202, traffic channel transceiver 203 and control channel transceiver 204 are connected to control unit 201, which controls the operation of autonomous system 200. Although not shown, control unit 201 is typically connected to telephony switching equipment such as a Private Branch Exchange (PBX) or Centrex.

In operation in the exemplary network shown in FIG. 1, scanner 202 scans for in-use frequencies of public system coverage areas PSP1, PSP2 and PSP3. This information is used by controller 201 to choose DCCHs and DTCs for autonomous coverage areas POF1 and POF2 that will not interfere with the DCCHs and DTCs of public coverage areas PSP1, PSP2 and PSP3. Per Section 4.20 of part 123 of ANSI/TIA/EIA-136, controller 201 formulates a PSP/POF list associated with the PSID of autonomous system 200 comprising up to eight of the in-use control channels, or PSPs, of public coverage areas PSP1, PSP2 and PSP3, and up to eight of the in-use control channels, or POFs, of autonomous system 200. This information is broadcast by a control channel transceiver 204 in a Neighbor Cell message over a E-BCCH of a control channel transceiver 204. When a MS camps on a DCCH of coverage areas POF1 or POF2, the MS performs an initial read of the E-BCCH and updates the PSP/POF list in its semi-permanent memory.

When controller 201 determines that scanner 202 has detected interference from cells PSP1, PSP2 or PSP3 on a current DCCH of cells POF1 or POF2, controller 201 performs the method of Applicants' invention. Interference from the public system on a DCCH channel of the autonomous system is manifest at the MS or BMI as an increase in the bit error rate, and is typically manifested as a degradation of service at the autonomous system. Also, this bit error rate increase is detected at the MS or BMI over several signal measurement cycles, allowing sufficient time for the method of Applicants' invention to complete before the MS would otherwise declare a Periodic Evaluation or Server Degradation reselection trigger condition and invoke the Channel Reselection procedure.

Figure 3:
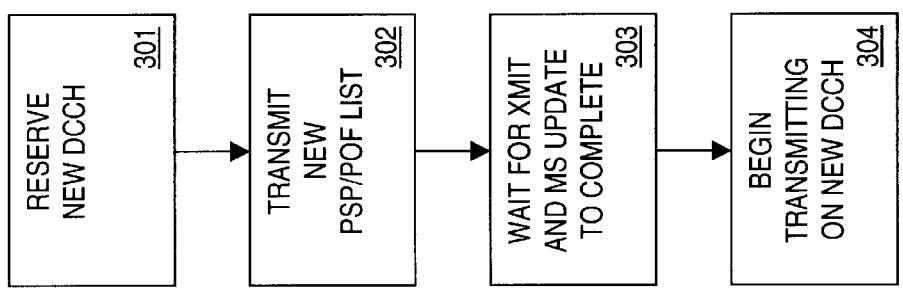
FIG. 3 shows a flow-chart illustrating the method of a preferred embodiment of the present invention.

FIG. 3 shows a flow-chart illustrating the method of a preferred embodiment of the present invention. It is important that this method be performed in the minimum time necessary for at least two reasons: it is incumbent upon the autonomous system to react quickly to minimize any interference it may be causing to the public systems in the area; and the method of the present invention must complete before the MS invokes the Channel Reselection procedure independent of this method and camps on a DCCH of the public system.

At step 301, controller 201 selects and reserves a new frequency for use by POF1 or POF2, whichever one is experiencing interference, for use as a DCCH channel. The new frequency is chosen from the frequencies of the band that are not otherwise in use by the public cells or such as won't cause co-channel interference with channels currently provisioned in neighboring cells of the autonomous system.

At step 302, controller 201 broadcasts an updated PSP/POF list on the E-BCCH of the current DCCH that contains the reserved DCCH channel in place of the current DCCH channel.

A DCCH channel is divided into hyperframes, each of which consist of two superframes. A full F-BCCH cycle is contained within one superframe. An E-BCCH cycle is of variable length, depending on which, if any, optional messages are included, and may span more than one superframe. In practice of Applicants' invention, all E-BCCH cycles are contained within one hyperframe, and this is assumed in the preferred embodiment. In a ANSI/TIA/EIA-136 compliant system, one superframe is transmitted in 640 ms.

Controller 201 signals a change to the control channel information by first transitioning the L2 BCN flag in all Short Message Service, Paging & Access Response Channel (SPACH) slots in the hyperframe preceding the one containing the start of the E-BCCH cycle having the updated PSP/POF list, then transitioning the E-BCCH Change flag (EC) of the F-BCCH to indicate that information elements of the E-BCCH have changed beginning with the E-BCCH cycle starting in the current hyperframe (Section 4 of part 121 of ANSI/TIA/EIA-136). The updated PSP/POF list is then transmitted on the E-BCCH cycle that begins with the current hyperframe.

The procedure by which controller 201 detects interference, reserves a new DCCH channel, and formulates an updated PSP/POF list for broadcast is asynchronous to DCCH transmissions. Controller 201 will wait an approximate maximum time to begin transmission, after the updated PSP/POF list is ready for transmission, of one hyperframe so as to allow for the start of the next hyperframe to occur.

At step 303, controller 201 waits a sufficient time to allow the transmission of the updated PSP/POF list to complete on the E-BCCH, and for mobile stations camped on the current DCCH to retrieve the updated PSP/POF list and to update their internal tables with this information. The broadcast of the new PSP/POF list will not affect the operation of mobile stations camping on the current DCCH since PSP/POF information is only considered when the MS executes the Channel Reselection procedure.

In the preferred embodiment, the transmission of the updated PSP/POF list is completed in two hyperframes. The first hyperframe contains the transitioned L2 BCN flag in all SPACH slots, and the second hyperframe contains the transitioned EC flag in the F-BCCH channel as well as the updated PSP/POF list in the E-BCCH channel. The transmission time required for the two hyperframes is about 2.4 seconds.

After transmission of the updated E-BCCH cycle completes, some time must be allowed for mobile stations camped on the DCCH to update their internal memory. In the preferred embodiment, completion of this step is asynchronous to DCCH transmissions, and an arbitrary value of about 2.6 seconds was chosen so as to define a 5 second wait between the start of transmission of the two hyperframes, and the completion of this step.

Alternatively, completion of this step may be synchronous to DCCH transmissions, and may occur, for example, four hyperframes after transmission of the first hyperframe occurs. In autonomous systems where an extensive PSP/POF list and/or inclusion of optional information elements in the E-BCCH channel may cause an E-BCCH cycle to span more than one hyperframe, it may be advantageous to define the completion of this step to be synchronous with the end of the E-BCCH cycle plus, for example, two additional hyperframes.

At step, 304, control channel transceiver 204 retunes to the reserved frequency and begins transmitting on the new DCCH channel. When the retune takes place, mobile stations camped on the current DCCH lose transmission on this channel, which causes the Radio Link Failure reselection trigger condition to occur. This, in turn, causes the mobile stations to invoke the Channel Reselection procedure. Since the mobile station PSP/POF lists now contain the new DCCH, the mobile stations will locate, lock to, and camp on the new DCCH.

When the MS detects loss of the current DCCH, the Channel Reselection procedure requires the MS to first camp on a public system DCCH before examining the PSP/POF list, locating the new autonomous DCCH, and camping on it. The delay during which the MS detects loss of the current autonomous DCCH and camps on a public DCCH before attempting to locate the new DCCH stored in the PSP/POF list is sufficient to allow control channel transceiver 204 to retune and begin transmitting the new DCCH.

While the present invention has been shown and described with respect to preferred embodiments, it will be understood by those skilled in the art that modifications may be made thereto without departing from the scope and spirit of the invention. For example, while the channel reselection procedure of Applicants is presented in the context of an autonomous system forced to reselect to a new DCCH due to interference from a public system, the condition causing the autonomous system to invoke the channel reselection procedure is not important to the operation of Applicants' invention. The condition causing the autonomous system to invoke Applicants' channel reselection procedure may be related to interference on the current DCCH caused by sources other than the public cellular system, or it may be caused by conditions completely unrelated to interference. Also, while the preferred embodiment describes selection of a new DCCH frequency as based on the new frequency not being in use by the public system, a more general condition typically applies in which the new DCCH frequency will not be in use by any source of transmission. Also, while the channel reselection procedure of Applicants is presented in the context of an autonomous system, the procedure is also applicable to the public cellular system. For example, a public cellular provider may want to reallocate control channel frequencies in its coverage area. In the context of a public cellular system, the updated PSP/POF list that is transmitted in step 302 is replaced by an updated neighbor list (NL) wherein the current DCCH is replaced by a new DCCH.

What is claimed is:

1. A method for reselecting a digital control channel (DCCH) by an autonomous cellular system that shares a set of defined frequencies with a public cellular system, the autonomous system transmitting on a current DCCH to one or more mobile stations, said method comprising the steps of:

reserving and identifying a particular new DCCH frequency from the set of frequencies, said new DCCH frequency not being in use;

transmitting an updated Public Service Profile/Private Operating Frequency (PSP/POF) list on the current DCCH wherein said new DCCH replaces the current DCCH;

waiting sufficient time for the transmission of said updated PSP/POF list and subsequent mobile station internal table updates to complete; and transmitting on said new DCCH and ceasing transmissions on the current DCCH;

whereby mobile stations camped on the current DCCH will lose transmission on the current DCCH, invoke the Channel Reselection Procedure, and camp on said new DCCH.

2. A method according to claim 1, wherein said step of waiting further comprises waiting a predetermined time interval.

3. A method according to claim 1, wherein transmissions within the autonomous system are structured in frames, and wherein said step of waiting further comprises waiting an interval that is synchronous with the transmission frames of the autonomous system.

4. A method for reselecting a digital control channel (DCCH) by a public cellular system that transmits on a set of defined frequencies, the public system transmitting on a current DCCH to one or more mobile stations, said method comprising the steps of:

reserving and identifying a particular new DCCH frequency from the set of frequencies, said new DCCH frequency not being in use;

transmitting an updated Neighbor List (NL) on the current DCCH wherein said new DCCH replaces the current DCCH;

waiting a sufficient time for the transmission of said updated NL and subsequent mobile station internal table updates to complete; and transmitting on said new DCCH and ceasing transmissions on the current DCCH;

whereby mobile stations camped on the current DCCH will lose transmission on the current DCCH, invoke the Channel Reselection Procedure, and camp on said new DCCH.

5. A method according to claim 4, wherein said step of waiting further comprises waiting a predetermined time interval.

6. A method according to claim 4, wherein transmissions within the public system are structured in frames, and wherein said step of waiting further comprises waiting an interval that is synchronous with the transmission frames of the public system.

7. A method for reselecting a digital control channel (DCCH) by a cellular system that transmits on a set of defined frequencies, the cellular system transmitting on a current DCCH to one or more mobile stations, said method comprising the steps of:

reserving and identifying a particular new DCCH frequency from the set of frequencies;

transmitting a Neighbor Cell message on the current DCCH wherein said new DCCH replaces the current DCCH;

waiting a sufficient time for the transmission of said Neighbor Cell message and subsequent mobile station internal table updates to complete; and transmitting on said new DCCH and ceasing transmissions on the current DCCH;

whereby mobile stations camped on the current DCCH will lose transmission on the current DCCH, invoke the Channel Reselection Procedure, and camp on said new DCCH.

8. A method according to claim 7, wherein said new DCCH frequency is not in use.

9. A method according to claim 7, wherein the cellular system is an autonomous cellular system that shares frequencies with a public cellular system, and wherein said Neighbor Cell message comprises a Public Service Profile/Private Operating Frequency (PSP/POF) list.

10. A method according to claim 7, wherein the cellular system is a public cellular system, and wherein said Neighbor Cell message comprises a Neighbor List (NL).

11. A method according to claim 7, wherein said step of waiting further comprises waiting a predetermined time interval.

12. A method according to claim 7, wherein transmissions within the cellular system are structured in frames, and wherein said step of waiting further comprises waiting an interval that is synchronous with the transmission frames of the cellular system.

13. An autonomous cellular system that shares a set of defined frequencies with a public cellular system, the autonomous cellular system transmitting on a current DCCH to one or more mobile stations, said autonomous cellular system comprising:

one or more traffic channel transceivers;

one or more control channel transceivers;

one or more scanners;

a controller connected to and operated to control said traffic channel transceivers, said control channel transceivers and said scanners;

said controller further operated to reserve and identifying a particular new Digital Control Channel (DCCH) frequency from the set of frequencies, said new DCCH frequency not being in use;

said controller further operated to transmit an updated Public Service Profile/Private Operating Frequency (PSP/POF) list on the current DCCH wherein said new DCCH replaces the current DCCH;

said controller further operated to wait sufficient time for the transmission of said updated PSP/POF list and subsequent mobile station internal table updates to complete; and said controller further operated to transmit on said new DCCH and ceasing transmissions on the current DCCH;

whereby mobile stations camped on the current DCCH will lose transmission on the current DCCH, invoke the Channel Reselection Procedure, and camp on said new DCCH.

14. A system according to claim 13, wherein said controller is further operated to wait a predetermined time interval for said transmission of said updated PSP/POF list and said subsequent mobile station internal table updates to complete.

15. A system according to claim 13, wherein transmissions within the autonomous system are structured in frames, and wherein said controller is further operated to wait an interval that is synchronous with the transmission frames of the autonomous system for said transmission of said updated PSP/POF list and said subsequent mobile station internal table updates to complete.

16. A public cellular system that transmits on a set of defined frequencies, the public cellular system transmitting on a current DCCH to one or more mobile stations, said public cellular system comprising:

one or more traffic channel transceivers;

one or more control channel transceivers;

a controller connected to and operated to control said traffic channel transceivers and said control channel transceivers;

said controller further operated to reserve and identifying a particular new Digital Control Channel (DCCH) frequency from the set of frequencies, said new DCCH frequency not being in use;

said controller further operated to transmit an updated Neighbor List (NL) on the current DCCH wherein said new DCCH replaces the current DCCH;

said controller further operated to wait sufficient time for said transmission of said updated NL and subsequent mobile station internal table updates to complete; and said controller further operated to transmit on said new DCCH and ceasing transmissions on the current DCCH;

whereby mobile stations camped on the current DCCH will lose transmission on the current DCCH, invoke the Channel Reselection Procedure, and camp on said new DCCH.

17. A system according to claim 16, wherein said controller is further operated to wait a predetermined time interval for said transmission of said updated NL and said subsequent mobile station internal table updates to complete.

18. A system according to claim 16, wherein transmissions within the public system are structured in frames, and wherein said controller is further operated to wait an interval that is synchronous with the transmission frames of the public system for said transmission of said updated NL and said subsequent mobile station internal table updates to complete.

19. A cellular system that transmits on a set of defined frequencies, the cellular system transmitting on a current DCCH to one or more mobile stations, said cellular system comprising:

one or more traffic channel transceivers;

one or more control channel transceivers;

a controller connected to and operated to control said traffic channel transceivers and said control channel transceivers;

said controller further operated to reserve and identifying a particular new Digital Control Channel (DCCH) frequency from the set of frequencies;

said controller further operated to transmit an updated Neighbor Cell message on the current DCCH wherein said new DCCH replaces the current DCCH;

said controller further operated to wait sufficient time for said transmission of said Neighbor Cell message and subsequent mobile station internal table updates to complete; and said controller further operated to transmit on said new DCCH and ceasing transmissions on current DCCH;

whereby mobile stations camped on the current DCCH will lose transmission on the current DCCH, invoke the Channel Reselection Procedure, and camp on said new DCCH.

20. A system according to claim 19, wherein said new DCCH frequency is not in use by the cellular system.

21. A system according to claim 19, wherein the cellular system is an autonomous cellular system that shares frequencies with a public cellular system, and wherein said Neighbor Cell message comprises a Public Service Profile/Private Operating Frequency (PSP/POF) list.

22. A system according to claim 19, wherein the cellular system is a public cellular system, and wherein said Neighbor Cell message comprises a Neighbor List (NL).

23. A system according to claim 19, wherein said controller is further operated to wait a predetermined time interval for said transmission of said Neighbor Cell message and said subsequent mobile station internal table updates to complete.

24. A system according to claim 19, wherein transmissions within the cellular system are structured in frames, and wherein said controller is further operated to wait an interval that is synchronous with the transmission frames of the cellular system for said transmission of said Neighbor Cell message and said subsequent mobile station internal table updates to complete.

* * * * *